(12) United States Patent
Hirose et al.

(10) Patent No.: US 6,382,165 B1
(45) Date of Patent: May 7, 2002

(54) ENGINE BALANCER APPARATUS (75) Inventors: Ichirou Hirose; Kazuo Isayama; Shinji Fujihira; Masaaki Sato, all of Hiroshima-ken (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 09/631,959

(22) Filed: Aug. 3, 2000

(30) Foreign Application Priority Data

Sep. 28, 1999 (JP) .......................................... 11-274622

(51) Int. Cl.⁷ ................................................ F02B 75/06
(52) U.S. Cl. ...................................... 123/192.2; 74/603
(58) Field of Search ........................ 123/192.2; 74/603, 74/604

(56) References Cited

U.S. PATENT DOCUMENTS 4,703,724 A * 11/1987 Candea et al. ........... 123/192.2
5,535,643 A    7/1996 Garza
5,755,145 A    5/1998 Iwata et al.

FOREIGN PATENT DOCUMENTS

| DE | 31 09 948 | 9/1982 |
| DE | 198 10 464 | 6/1999 |
| EP | 0 789 165 | 8/1997 |
| JP | 6-193681 | * 7/1994 |
| JP | 8-100837 | 4/1996 |

OTHER PUBLICATIONS

Patent Abstracts of Japan, vol. 007, No. 287 (M–264), Dec. 21, 1983 & JP 58 160642 A (Yanmar Diesel KK), Sep. 24, 1983.

* cited by examiner

Primary Examiner—Noah P. Kamen (57) ABSTRACT

A balancer case (21) is coupled to the lower portion of a cylinder block (10) through turrets (12) made of a material having almost the same coefficient of linear expansion as that of a crankshaft (11) and balancer shaft (22).

14 Claims, 6 Drawing Sheets

ENGINE BALANCER APPARATUS

FIELD OF THE INVENTION

The present invention relates to an engine balancer apparatus for canceling vibration of a crankshaft.

BACKGROUND OF THE INVENTION

As a conventional engine balancer apparatus, for example, Japanese Patent Laid-Open No. 8-100837 discloses a structure in which the axial center of a mass portion formed on a balancer shaft is set to coincide with the axial center of a crankshaft to transmit power from the rear side of the crankshaft to the balancer shaft.

In this prior art, while the crankshaft and balancer shaft are made of substantially the same materials (cast iron or the like), a cylinder block for axially supporting the crankshaft is made of a material (aluminum alloy or the like) different from that of the crankshaft and balancer shaft. Accordingly, due to a difference in thermal expansion, meshing of gears (or a chain and sprocket) for transmitting the power from the crankshaft to the balancer shaft degrades to sometimes cause backlash noise (or chain noise).

SUMMARY OF THE INVENTION

The present invention has been made in view of the above problem, and has as its object to provide an engine balancer apparatus for reducing backlash noise or the like which is generated when meshing of gears degrades due to a difference in thermal expansion.

In order to solve the above problem and achieve the object, according to the first aspect, a balancer shaft has a support portion made of a material having substantially the same coefficient of linear expansion as that of the balancer shaft and a crankshaft, and the support portion extends from a cylinder block position corresponding to the axis of the crankshaft. Thus, the material of the cylinder block from the axis of the crankshaft to the position for supporting the balancer shaft is replaced by the material of the support portion, and when thermal expansion occurs, the amount of thermal expansion from the axis of the crankshaft to the axis of the balancer shaft and the amount of thermal expansion of the support portion can be set to be substantially the same. Therefore, degradation in meshing of gears for transmitting power from the crankshaft to the balancer shaft is suppressed, thereby reducing backlash.

According to the second aspect, since power transmitting means for transmitting power from the crankshaft to the balancer shaft is arranged on the flywheel side of an engine, an adverse influence of the torsion of the crankshaft can be minimized.

According to the third aspect, since the crankshaft has a driving gear meshing with a driven gear of the balancer shaft, degradation in meshing of the gears is suppressed, thereby reducing the backlash noise.

According to the fourth aspect, since the gears of the crankshaft and the balancer shaft are formed by press-fitting annular members having gears onto circular disk members provided to the shafts, the gears can be built on the shafts easily.

According to the fifth aspect, a coefficient of linear expansion of one of the annular members with a diameter larger than that of corresponding one of the circular disk members is set substantially the same as a coefficient of linear expansion of the support portion of the balancer shaft. Thus, the material of the support portion can be set to match that of the annular members with a larger amount of expansion, thereby minimizing degradation in meshing of the gears.

According to the sixth aspect, the crankshaft and the balancer shaft are made of the same material. Thus, the amount of expansion of the support of the balance portion becomes substantially the same as those of the crankshaft and the balancer shaft. Degradation in meshing of the gears is thus suppressed, thereby reducing backlash noise.

According to the seventh aspect, the support portion of the balancer shaft forms a lubricant supply path to the balancer shaft. Thus, the lubricant supply path can be assured.

According to the eighth aspect, the apparatus is a secondary balancer apparatus for suppressing secondary vibration of a four-cylinder engine, and is arranged such that the center of a resultant force of balancer weights provided to the balancer shaft coincides with the center of a vibration system of the crankshaft. Therefore, secondary vibration can be canceled effectively.

According to the ninth aspect, in addition to the effect of aspect 1, the adverse influence of the torsion of the crankshaft can be minimized.

According to the tenth aspect, in addition to the effects of aspects 1 and 3, a lubricant supply path can be ensured.

Other features and advantages of the present invention will be apparent from the following description taken in conjunction with the accompanying drawings, in which like reference characters designate the same or similar parts throughout the figures thereof.

Other objects and advantages besides those discussed above shall be apparent to those skilled in the art from the description of a preferred embodiment of the invention which follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The preferred embodiments of the present invention will be described in detail with reference to the accompanying drawings.

Figure 1:
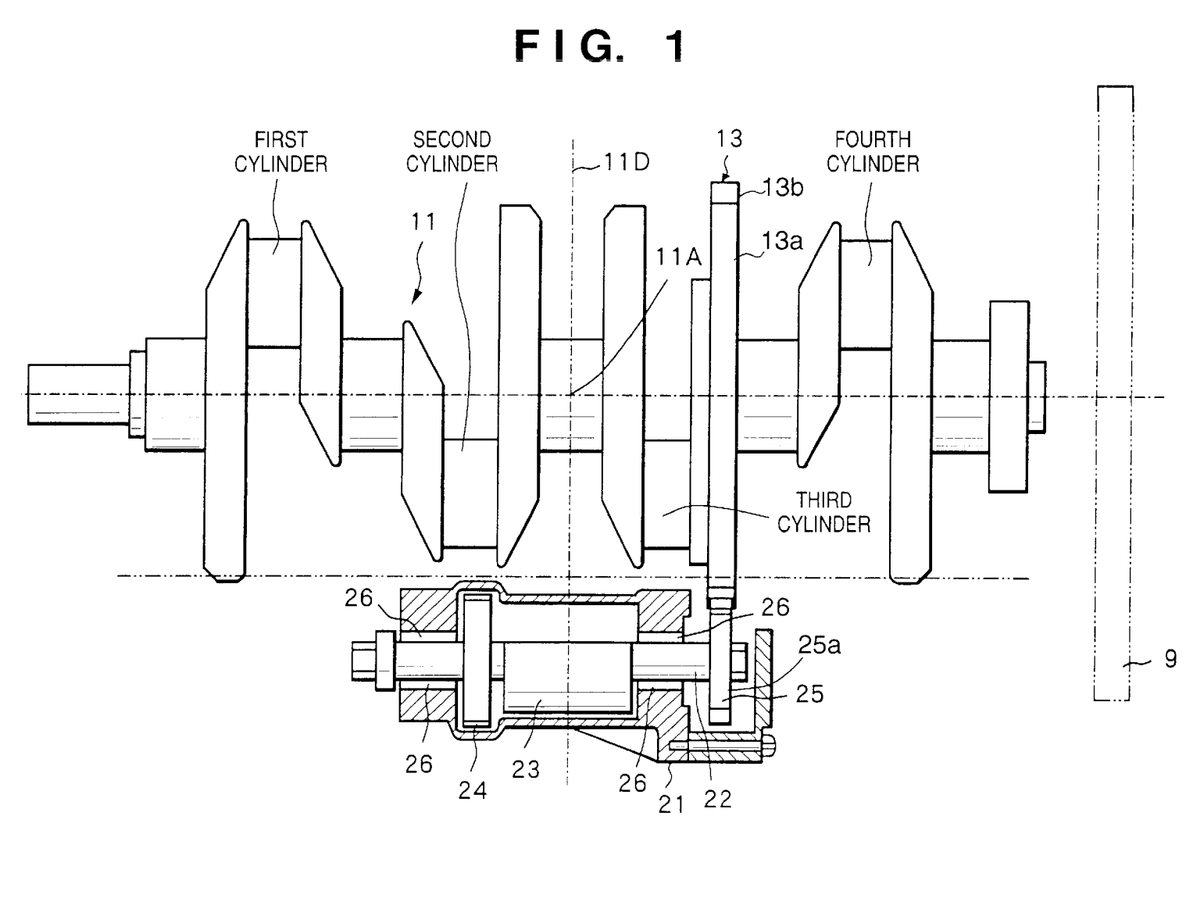
FIG. 1 is a view showing the lower structure of an in-series 4-cylinder engine on which an engine balancer apparatus according to an embodiment of the present invention is to be mounted.
Figure 2:
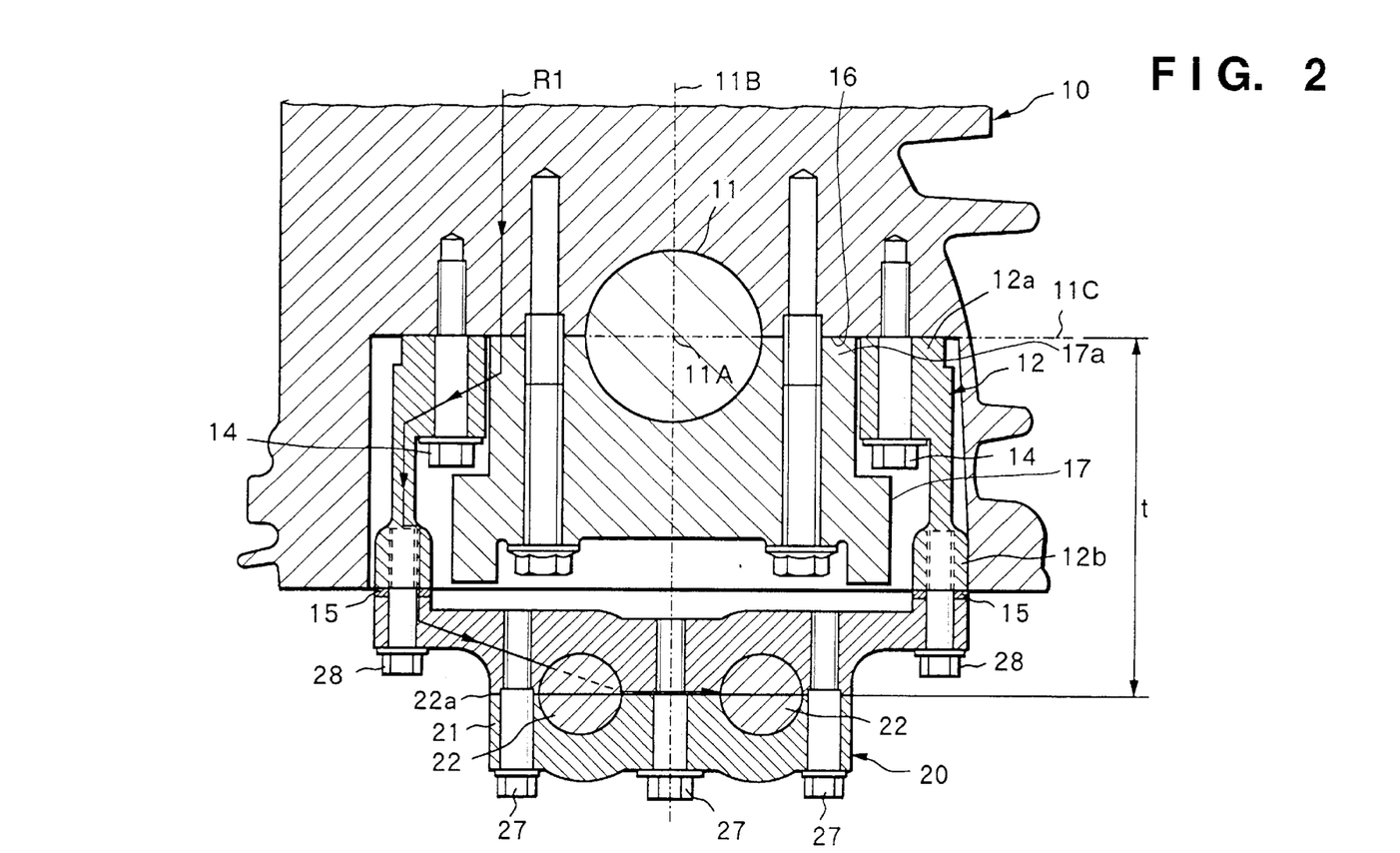
FIG. 2 is a view showing a support structure for a cylinder block and the balancer apparatus.
Figure 3:
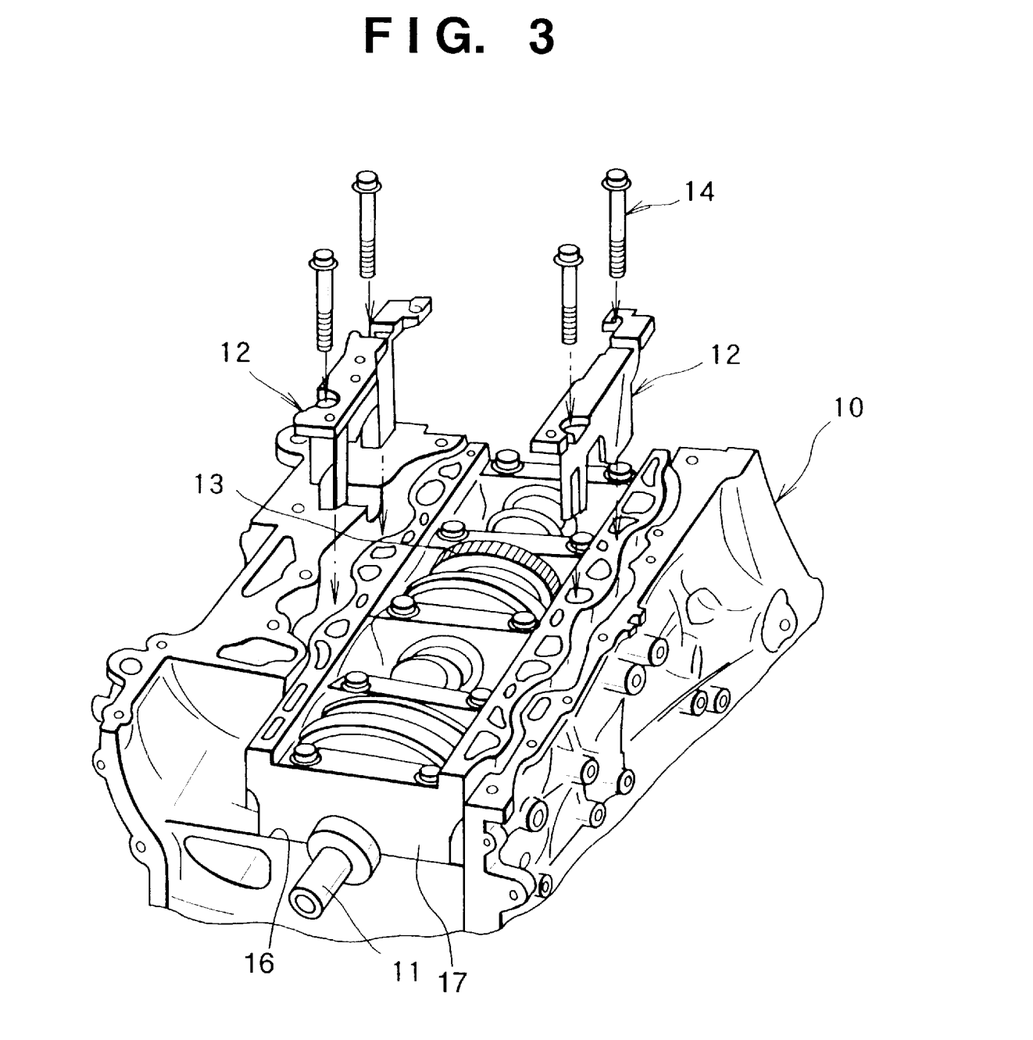
FIG. 3 is an exploded perspective view for explaining how to build turrets on the cylinder block.
Figure 4:
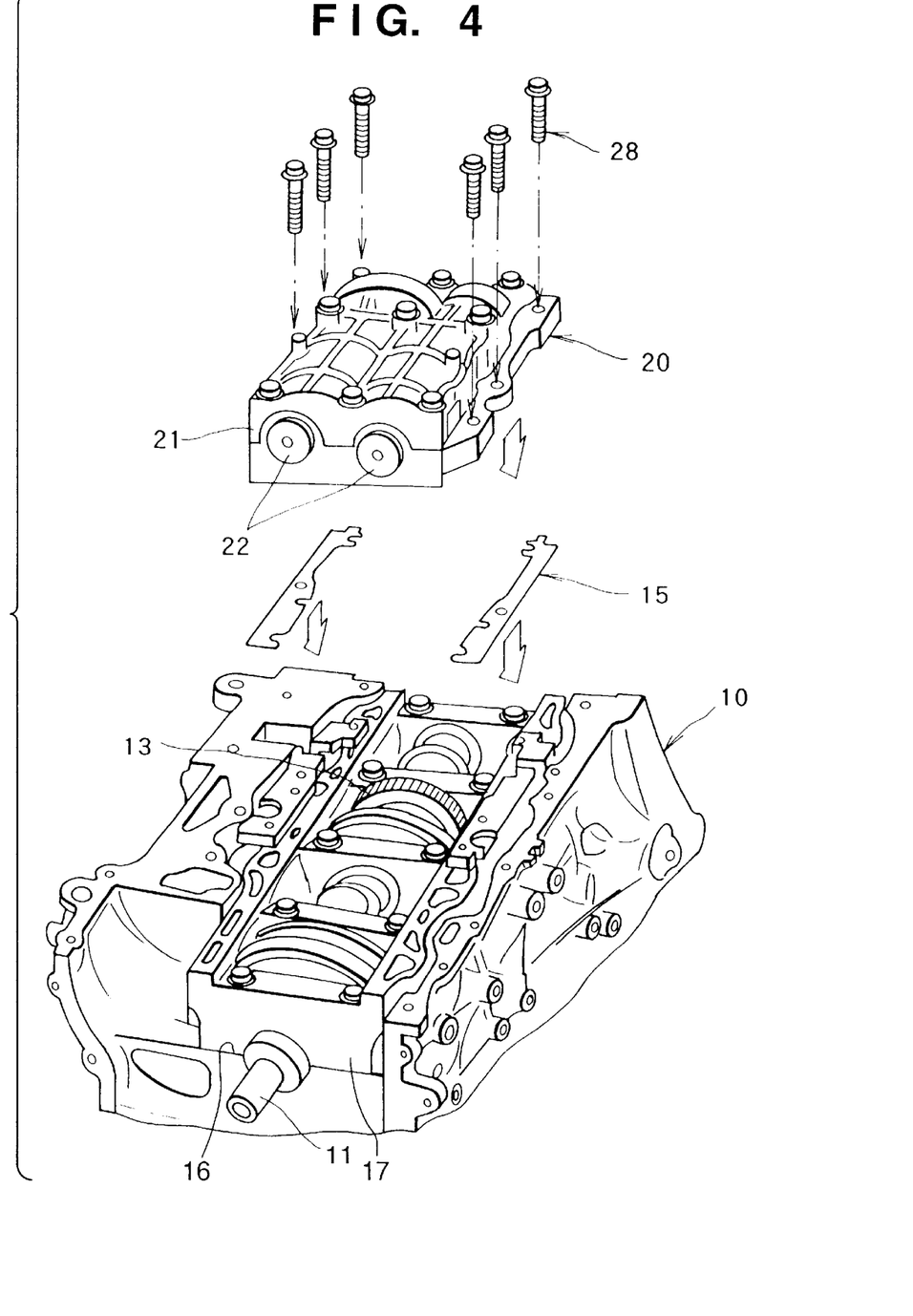
FIG. 4 is an exploded perspective view for explaining how to build the balancer apparatus on the cylinder block.
Figure 5:
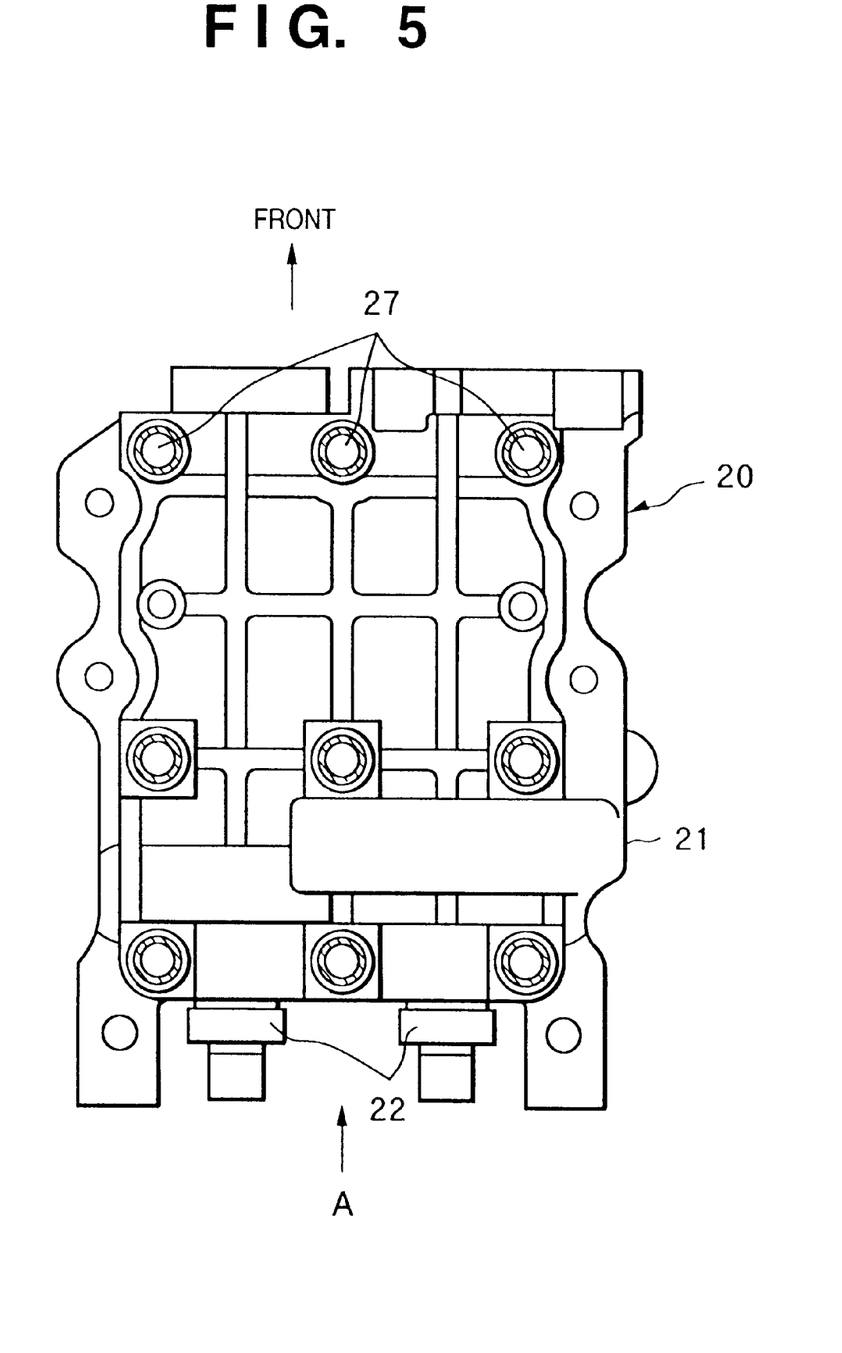
FIG. 5 is a bottom view of the balancer apparatus shown in FIG. 4.
Figure 6:
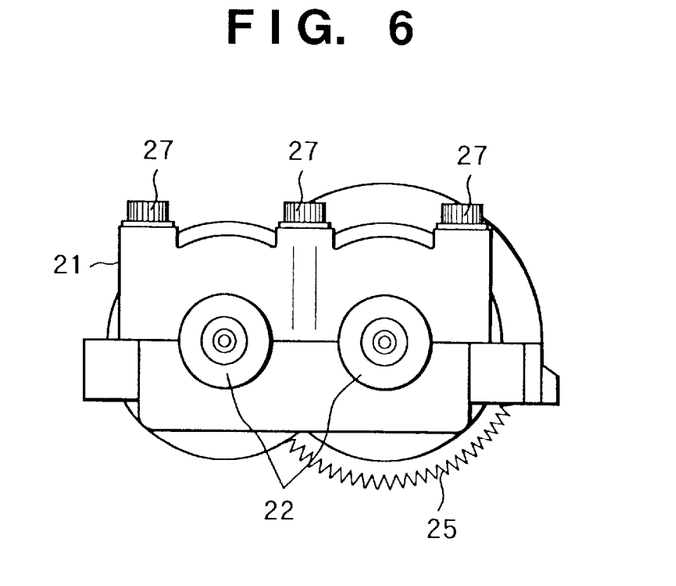
FIG. 6 is a view of FIG. 5 seen from a direction A.

FIG. 1 is a view showing the lower structure of an in-series 4-cylinder engine on which an engine balancer apparatus according to an embodiment of the present invention is to be mounted. FIG. 2 is a view showing a support structure for a cylinder block and the balancer apparatus. FIG. 3 is an exploded perspective view for explaining how to build turrets on the cylinder block. FIG. 4 is an exploded perspective view for explaining how to build the balancer apparatus on the cylinder block. FIG. 5 is a bottom view of the balancer apparatus shown in FIG. 4. FIG. 6 is a view of FIG. 5 seen from a direction A.

As shown in FIGS. 1 to 6, in the in-series 4-cylinder gasoline engine according to this embodiment, a balancer apparatus 20 is attached to the lower portion of an aluminum alloy cylinder block 10.

The cylinder block 10 axially supports a crankshaft 11, and a balancer case 21 of the balancer apparatus 20, at its lower portion, through turrets 12.

Two balancer shafts 22 are axially supported in the balancer case 21 to be symmetric in the horizontal direction with reference to a vertical straight line 11B extending through an axis 11A of the crankshaft 11. The balancer case 21 is vertically divided at its portion coinciding with an axial center 22a of the balancer shafts 22 so that the balancer shafts 22, bearings 26, and the like can be built it easily. The upper and lower halves of the balancer case 21 are coupled to each other with a plurality of bolts 27.

A balancer weight 23 and reverse gear 24 are closely, integrally formed on each balancer shaft 22. Each balancer shaft 22 is axially supported at two points by the bearings 26 formed at two ends, in the axial direction, of the balancer weight 23 and reverse gear 24. Power is transmitted from one balancer shaft 22 to the other through meshing of the two reverse gears 24.

A driven gear 25 to mesh with a driving gear 13 of the crankshaft 11 is axially mounted on one balancer shaft 22. Hence, a driving force is transmitted from the crankshaft 11 to one balancer shaft 22, and the two balancer shafts 22 rotate together with the crankshaft 11.

The driving gear 13 of the crankshaft 11 and the driven gear 25 of the balancer shaft 22 are forged members. The driving rear 13 and driven gear 25 are formed by press-fitting annular members 13b and 25b, having helical gears on their circumferences, onto circular disk members 13a and 25a integrally formed with the shafts 11 and 22. With this arrangement, the gears 13 and 25 can be built on the shafts 11 and 22 easily. Since the helical gears have larger contact areas than those of other types of gears, the transmission efficiency of the driving force is improved.

The coefficient of linear expansion of one of the annular members 13b and 25b with a diameter larger than that of corresponding one of the circular disk members 13a and 25a is set almost the same as the coefficient of linear expansion of the turrets 12 of the balancer shafts 22. With this arrangement, the material of the turrets 12 can be set to match that of the annular members 13b and 25b with a larger amount of thermal expansion, thereby minimizing degradation in meshing of the gears.

The crankshaft 11 and balancer shafts 22 are made of the same material. Thus, the amount of expansion of the turrets 12 of the balancer shafts 22 becomes almost the same as that of the crankshaft 11 and balancer shafts 22. Degradation in meshing of the gears is suppressed, thereby reducing the backlash noise.

A flywheel 9 is axially mounted downstream of a direction along which the driving force is transmitted from the crankshaft 11 to a transmission (not shown). The driving gear 13 of the crankshaft 11 is arranged on the flywheel side (in this embodiment, between the third and fourth cylinders) where torsion of the crankshaft 11 is small.

The turrets 12 are made of a material (e.g., cast iron) with almost the same coefficient of linear expansion as that of the crankshaft 11 and balancer shafts 22. One end 12a of each turret 12 is coupled to the cylinder block 10 with bolts 14, and the other end 12b thereof is fastened by bolts 28, so that the balancer case 21 is held under the cylinder block 10 through a spacer 15. The spacers 15 serve to cancel a building error between the balancer case 21 and cylinder block 10.

When the crankshaft 11 and balancer shafts 22 are made of different materials, the turrets 12 are made of at least almost the same material as that of either the crankshaft 11 or balancer shafts 22. Considering interference and scuffing between the gears, the material of the turrets 12 is preferably set to match that of either the crankshaft 11 or balancer shafts 22 with a larger amount of thermal expansion. This includes setting the amount of thermal expansion of the turrets 12 such that the sum of the amount of thermal expansion of the crankshaft 11 side (including the gear) and that of the balancer shafts 22 side (including the gears) becomes almost equal to the amount of thermal expansion of the turrets 12 (at a predetermined temperature within a temperature range where the use frequency is high).

The upper end face of one end 12a of each turret 12 coincides with a horizontal straight line 11C extending through the axis 11A of the crankshaft 11. A flat surface 16 of the cylinder block 10 is formed along the horizontal straight line 11C which horizontally coincides with the axis 11A of the crankshaft 11. The upper end face of one end 12a of each turret 12 and an upper end face 17a of a bearing cap 17 for supporting the crankshaft 11 are attached to the flat surface 16 of the cylinder block 10. Thus, a machine process of a cylinder block can be easier by attaching the turret 12 and the bearing cap 17 to the same flat surface 16 of the cylinder block 10.

A hole for supplying a lubricant from the cylinder block 10 to the balancer apparatus 20 is formed in each turret 12 to extend from its one end 12a to the other end 12b. More specifically, the lubricant in the cylinder block 10 flows from one end 12a to the other end 12b of each turret 12 to reach the interior of the balancer case 21 through an abutting surface of the lower portion of the cylinder block 10 and the balancer case 21 (see a lubricant path R1 shown in FIG. 2).

The balancer apparatus 20 of this embodiment is disposed to cancel the secondary vibration of particularly an in-series 4-cylinder engine, such that the center of the resultant force of the two balancer weights 23 provided to the respective balancer shafts 22 coincides with the center of gravity of the vibration system, i.e., a straight line 11D extending through the axis 11A of the crankshaft 11 and the axial center of the crankshaft 11.

As has been described above, according to this embodiment, the balancer case 21 is coupled to the lower portion of the cylinder block 10 through the turrets 12 made of the material having almost the same coefficient of linear expansion as that of the crankshaft 11 or balancer shafts 22, and the upper end face of the one end 12a of each turret 12 is set to coincide with the horizontal straight line 11C extending through the axis 11A of the crankshaft 11. Thus, the amount of thermal expansion of the cylinder block 10 in the vertical direction is almost equal to that of the turrets 12. Namely, when thermally expanded, the amount of expansion of the turrets 12 becomes almost equal to that within a distance t from the axis 11A of the crankshaft 11 to the axial center 22a of the balancer shafts 22, and degradation in meshing of the gears for transmitting the power from the crankshaft 11 to the balancer shafts 22 is suppressed, thereby reducing the backlash noise.

Figure 7:
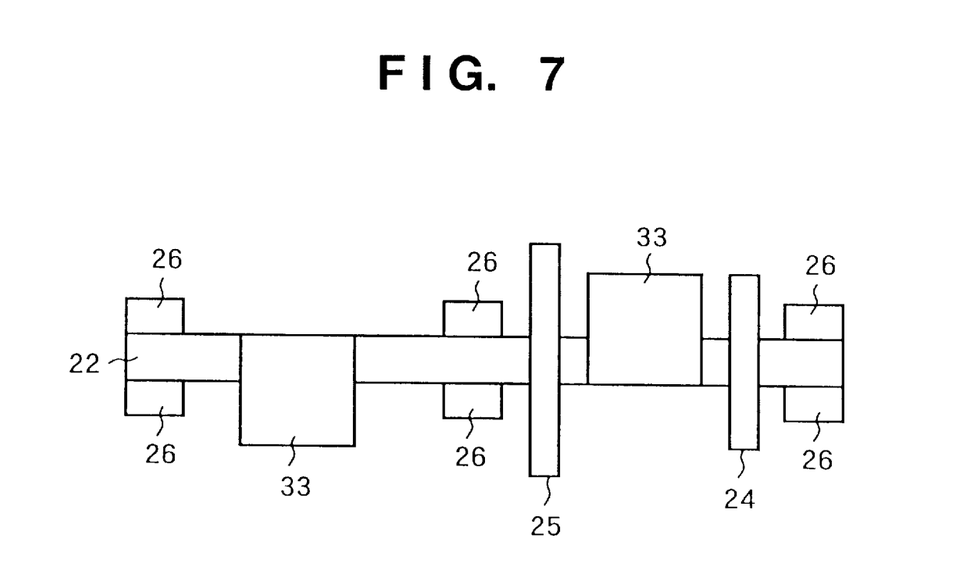
FIG. 7 is a schematic view of a balancer apparatus to be mounted on an in-series 5-cylinder engine.

This embodiment is not limited to an in-series 4-cylinder engine. For example, when this embodiment is to be applied to an in-series 5-cylinder engine, a pitching moment occurs, as shown in FIG. 7. Therefore balancer weights 33 are provided at positions opposite to each other with respect to each balancer shaft 22. The ignition timing and the like are adjusted to decrease primary vibration, and secondary vibration is canceled by the balancer shaft 22. In the in-series 5-cylinder engine, the center of the resultant force of all the balancer weights need not coincide with the center of gravity of the vibration system, i.e., the axis of the crankshaft and the axial center of the crankshaft.

Except for this, the constituent components of the arrangement shown in FIG. 7 are denoted by the same reference numerals as those of the arrangement described with reference to FIGS. 1 to 6, and a detailed description thereof will be omitted.

The present invention can be applied to changes or modifications of the above embodiment within a range not departing from the spirit of the invention.

For example, meshing of the crankshaft and balancer shaft may be replaced by a chain and sprocket.

In the case of an in-series 4-cylinder engine, a balancer weight provided to one balancer shaft may be divided into a plurality of portions. It suffices if the balancer weights are arranged such that the center of the resultant force of all the balancer weights coincides with the center of gravity of the vibration system.

The present invention is not limited to the above embodiments and various changes and modifications can be made within the spirit and scope of the present invention. Therefore, to apprise the public of the scope of the present invention the following claims are made.

What is claimed is:

1. An engine balancer apparatus installed under a cylinder block and having a crankshaft and balancer shaft that are made of materials different from that of said cylinder block, wherein
   said crankshaft has a driving gear meshing with a driven gear of said balancer shaft,
   said balancer shaft has a support portion made of a material having substantially the same coefficient of linear expansion as that of said balancer shaft and said crankshaft, said support portion extending from said cylinder block corresponding to an axis of said crankshaft,
   an upper end face of said support portion being set to coincide with a horizontal straight line extending through the axis of said crankshaft; and
   said balancer apparatus comprising
      a first portion surrounding the balancer shaft,
      a second portion comprising an arm extending from the first portion in a first direction, and
      a third portion comprising an arm extending from the second portion in a second direction, the second and third portions being substantially perpendicular to the axis of the crankshaft.

2. The apparatus according to claim 1, wherein power transmitting means for transmitting power from said crankshaft to said balancer shaft is arranged on a flywheel side of an engine.

3. The apparatus according to claim 1, wherein said crankshaft has a driving gear meshing with a driven gear of said balancer shaft.

4. The apparatus according to claim 3, wherein said gears of said crankshaft and said balancer shaft are formed by press-fitting annular members having gears onto circular disk members provided to said shafts.

5. The apparatus according to claim 4, wherein a coefficient of linear expansion of one of said annular members with a diameter larger than that of corresponding one of said circular disk members is set substantially the same as a coefficient of linear expansion of said support portion of said balancer shaft.

6. The apparatus according to claim 1, wherein said crankshaft and said balancer shaft are made of the same material.

7. The apparatus according to claim 1, wherein said support portion of said balancer shaft forms a lubricant supply path to said balancer shaft.

8. The apparatus according to claim 1, wherein said apparatus is a secondary balancer apparatus for suppressing secondary vibration of a four-cylinder engine, and is arranged such that a center of a resultant force of balancer weights provided to said balancer shaft coincides with a center of a vibration system of said crankshaft.

9. The apparatus according to claim 1, wherein the support portion extends from the balancer apparatus in the second direction.

10. An engine balancer installed under a cylinder block, comprising:
    a crankshaft, the crankshaft being made of a material different from a material of the cylinder block;
    a balancer shaft, the balancer shaft being made of a material different from the material of the cylinder block; and
    a support portion extending from the cylinder block to support the balancer shaft, the support portion being made of a material having a substantially same coefficient of linear expansion as that of the material of the balancer shaft and the material of the crankshaft, the support portion comprising an upper end face coinciding with a horizontal line extending through an axis of the crankshaft, wherein
    said crankshaft further comprises a driving gear meshing with a driven gear of said balancer shaft, and
    said balancer apparatus comprising
      a first portion surrounding the balancer shaft,
      a second portion comprising an arm extending from the first portion in a first direction, and
      a third portion comprising an arm extending from the second portion in a second direction, the second and third portions being substantially perpendicular to the axis of the crankshaft.

11. The engine balancer of claim 10, further comprising power transmitting means for transmitting power from the crankshaft to the balancer shaft.

12. The engine balancer of claim 10, wherein the crankshaft further comprises a driving gear, the balancer shaft further comprises a driven gear meshing with the driving gear, and the support portion forms a lubricant supply path to the balancer shaft.

13. An engine balancer apparatus installed under a cylinder block and having a crankshaft and balancer shaft that are made of material different from that of said cylinder block, wherein
    said crankshaft has a driving gear meshing with a driven gear of said balancer shaft, said balancer shaft has a support portion made of a material having substantially the same coefficient of linear expansion as that of said balancer shaft and said crankshaft, said support portion extending from said cylinder block corresponding to an axis of said crankshaft, an upper end face of said support portion being set to coincide with a horizontal straight line extending through the axis of said crankshaft, power transmitting means for transmitting power from said crankshaft to said balancer shaft is arranged on a flywheel side of an engine, and said balancer apparatus further comprises
a first portion surrounding the balancer shaft,
a second portion comprising an arm extending from the first portion in a first direction, and
a third portion comprising an arm extending from the second portion in a second direction the second portion is substantially perpendicular to the third portion, the second and third portions being substantially perpendicular to the axis of the crankshaft.

14. An engine balancer apparatus installed under a cylinder block and having a crankshaft and balancer shaft that are made of materials different from that of said cylinder block, wherein said balancer shaft has a support portion made of a material having substantially the same coefficient of linear expansion as that of said balancer shaft and said crankshaft, said support portion extending from said cylinder block corresponding to an axis of said crankshaft, an upper end face of said support portion being set to coincide with a horizontal straight line extending through the axis of said crankshaft, said crankshaft has a driving gear meshing with a driven gear of said balancer shaft, said support portion of said balancer shaft forms a lubricant supply path to said balancer shaft, and said balancer apparatus comprising
a first portion surrounding the balancer shaft,
a second portion comprising an arm extending from the first portion in a first direction, and
a third portion comprising an arm extending from the second portion in a second direction, the second and third portions being substantially perpendicular to the axis of the crankshaft.

* * * * *